(12) United States Patent
Holtz et al.

(10) Patent No.: US 10,118,846 B2
(45) Date of Patent: Nov. 6, 2018

(54) TREE BOX FILTER WITH HYDROMODIFICATION PANELS

(71) Applicant: Oldcastle Precast, Inc., Atlanta, GA (US)

(72) Inventors: James Ferguson Holtz, Portland, OR (US); Chris Ryan Demarest, Livermore, CA (US)

(73) Assignee: Oldcastle Precast, Inc., Atlanta, GA (US)

( * ) Notice: Subject to any disclaimer, the term of this patent is extended or adjusted under 35 U.S.C. 154(b) by 8 days.

(21) Appl. No.: 14/975,739

(22) Filed: Dec. 19, 2015

(65) Prior Publication Data

US 2016/0176732 A1     Jun. 23, 2016

Related U.S. Application Data

(60) Provisional application No. 62/094,540, filed on Dec. 19, 2014.

(51) Int. Cl.
*C02F 3/32* (2006.01)
*C02F 3/04* (2006.01)
*E03F 5/16* (2006.01)
*C02F 103/00* (2006.01)

(52) U.S. Cl.
CPC ............... *C02F 3/327* (2013.01); *C02F 3/04* (2013.01); *C02F 3/043* (2013.01); *C02F 3/046* (2013.01); *E03F 5/16* (2013.01); *C02F 2103/001* (2013.01); *C02F 2203/006* (2013.01); *Y02W 10/15* (2015.05)

(58) Field of Classification Search
CPC .......... C02F 3/327; C02F 3/043; C02F 3/046; C02F 2103/001; C02F 3/04; C02F 2203/006; E03F 5/16
USPC .... 210/602, 615, 616, 617, 747.2, 163, 164, 210/170.03
See application file for complete search history.

(56) References Cited

U.S. PATENT DOCUMENTS

| | | | |
|---|---|---|---|
| 4,537,687 A | 8/1985 | Piper |
| 4,682,907 A | 7/1987 | Gaudin |
| 5,322,629 A | 6/1994 | Stewart |
| 5,437,786 A | 8/1995 | Horsley et al. |
| 5,549,817 A | 8/1996 | Horsley et al. |
| 5,569,387 A | 10/1996 | Bowne et al. |
| 5,624,576 A | 4/1997 | Lenhart et al. |
| 5,702,593 A | 12/1997 | Horsley et al. |
| 5,707,527 A | 1/1998 | Knutson et al. |

(Continued)

FOREIGN PATENT DOCUMENTS

WO     WO 2010118110 A1     10/2010

OTHER PUBLICATIONS

PCT, International Search Report for International Application No. PCT/US 10/30206, dated Jun. 10, 2010.

(Continued)

*Primary Examiner* — Fred Prince (57) ABSTRACT

The invention provides structures, methods, and assemblies for bioretention systems, including tree box filters with substantially permeable panels integrated into a bottom portion of the tree box filter. The invention also provides methods and additional structures that are useful for managing stormwater flow and inhibiting the flow of pollutants, debris, and other contaminants into drainage systems.

24 Claims, 7 Drawing Sheets

(56) References Cited

U.S. PATENT DOCUMENTS

| | | | |
|---|---|---|---|
| 5,728,305 A | 3/1998 | Hawakinson | |
| 5,744,048 A | 4/1998 | Stetler | |
| 5,759,415 A | 6/1998 | Adams | |
| 5,788,848 A | 8/1998 | Blanche et al. | |
| 5,855,775 A | 1/1999 | Kerfoot | |
| 5,985,157 A | 11/1999 | Leckner et al. | |
| 6,027,639 A | 2/2000 | Lenhart, Jr. et al. | |
| 6,132,603 A | 10/2000 | Mokrzycki et al. | |
| 6,277,274 B1 | 8/2001 | Coffman | |
| 6,350,374 B1 | 2/2002 | Stever et al. | |
| 6,383,373 B1 | 5/2002 | Nakao et al. | |
| 6,406,218 B1 | 6/2002 | Olson | |
| 6,511,595 B2 | 1/2003 | Crompton et al. | |
| 6,531,059 B1 | 3/2003 | Morris et al. | |
| 6,569,321 B2 | 5/2003 | Coffman | |
| 6,641,720 B1 | 11/2003 | Crompton et al. | |
| 6,649,048 B2 | 11/2003 | de Ridder et al. | |
| 6,652,743 B2 | 11/2003 | Wallace et al. | |
| 6,676,832 B2 | 1/2004 | de Bruijn | |
| 6,783,683 B2 | 8/2004 | Collings | |
| 6,881,338 B2 | 4/2005 | Austin et al. | |
| 6,905,599 B2 | 6/2005 | Allard | |
| 6,991,114 B2 | 1/2006 | Allen, II et al. | |
| 6,991,402 B2 | 1/2006 | Burkhart | |
| 6,991,734 B1 | 1/2006 | Smith et al. | |
| 6,998,038 B2 | 2/2006 | Howard | |
| 7,022,243 B2 | 4/2006 | Bryant | |
| 7,080,480 B2 | 7/2006 | Urban et al. | |
| 7,083,721 B2 | 8/2006 | McClure et al. | |
| 7,101,476 B2 | 9/2006 | Kim | |
| 7,160,058 B2 | 1/2007 | Burkhart | |
| 7,186,058 B2 | 3/2007 | Schluter et al. | |
| 7,186,333 B2 | 3/2007 | Kluge | |
| 7,237,981 B1 | 7/2007 | Vitarelli | |
| 7,294,256 B2 | 11/2007 | Happel et al. | |
| 7,296,692 B2 | 11/2007 | Allen, II et al. | |
| 7,297,266 B2 | 11/2007 | Cobb et al. | |
| 7,344,335 B2 | 3/2008 | Burkhart | |
| 7,425,261 B2 | 9/2008 | Siviter et al. | |
| 7,425,262 B1 | 9/2008 | Kent | |
| 7,441,661 B2 * | 10/2008 | Phillips | E03F 5/14 209/156 |
| 7,470,362 B2 | 12/2008 | Kent | |
| 7,473,373 B1 | 1/2009 | Danler | |
| 7,510,649 B1 | 3/2009 | Lavigne | |
| 7,582,216 B2 | 9/2009 | Arnott et al. | |
| 7,625,485 B2 | 12/2009 | Siviter et al. | |
| 7,638,065 B2 | 12/2009 | Stever | |
| 7,674,378 B2 | 3/2010 | Kent | |
| 7,686,956 B1 | 3/2010 | Casebier | |
| 7,776,217 B2 | 8/2010 | Lucas | |
| 7,833,412 B2 | 11/2010 | Holtz | |
| 7,967,979 B2 | 6/2011 | Grewal et al. | |
| 7,985,335 B2 | 7/2011 | Allard | |
| 8,012,346 B2 | 9/2011 | Peters, Jr. et al. | |
| 8,110,105 B2 | 2/2012 | Allen, II et al. | |
| 8,113,740 B2 | 2/2012 | Boulton et al. | |
| 8,157,991 B2 | 4/2012 | Wilhelms et al. | |
| 8,287,728 B2 | 10/2012 | Kania et al. | |
| 8,303,816 B2 | 11/2012 | Kent et al. | |
| 8,318,015 B2 | 11/2012 | Allen, II et al. | |
| 8,333,885 B1 | 12/2012 | Iorio | |
| 8,501,016 B2 | 8/2013 | Lord et al. | |
| 8,535,533 B2 | 9/2013 | Allard | |
| 8,555,586 B2 | 10/2013 | Lowe et al. | |
| 8,591,729 B2 | 11/2013 | Alqanee | |
| 8,622,647 B2 | 1/2014 | Flood, Jr. et al. | |
| 8,679,327 B2 | 3/2014 | Mellot et al. | |
| 8,795,518 B2 | 8/2014 | Alsaffar | |
| 8,911,626 B2 | 12/2014 | Allard | |
| 9,469,981 B2 | 10/2016 | Allard | |
| 9,506,233 B2 | 11/2016 | Allard | |
| 9,512,606 B2 | 12/2016 | Allard | |
| 9,540,799 B2 | 1/2017 | Allard | |
| 2002/0057944 A1 | 5/2002 | Adams et al. | |
| 2003/0089652 A1 * | 5/2003 | Matsui | C02F 1/00 210/163 |
| 2004/0226869 A1 | 11/2004 | McClure et al. | |
| 2004/0251185 A1 * | 12/2004 | Pitt | B01D 21/0012 210/163 |
| 2005/0285011 A1 | 12/2005 | Harwood | |
| 2006/0151387 A1 | 7/2006 | Yost et al. | |
| 2007/0068878 A1 | 3/2007 | Stever et al. | |
| 2007/0199869 A1 | 8/2007 | Al-Assfour | |
| 2007/0262009 A1 | 11/2007 | Fitzgerald | |
| 2008/0121594 A1 | 5/2008 | Dierkes | |
| 2008/0217227 A1 | 9/2008 | Pank | |
| 2008/0217257 A1 | 9/2008 | Pank | |
| 2008/0251448 A1 | 10/2008 | Kent | |
| 2009/0050583 A1 | 2/2009 | Arnott et al. | |
| 2009/0218299 A1 | 9/2009 | Cote et al. | |
| 2009/0250405 A1 | 10/2009 | Allard | |
| 2010/0206790 A1 | 8/2010 | Holtz | |
| 2011/0147303 A1 | 6/2011 | Allard | |
| 2011/0186492 A1 * | 8/2011 | Holtz | C02F 1/00 210/170.03 |
| 2012/0031854 A1 | 2/2012 | Allard | |
| 2012/0152827 A1 | 6/2012 | Allard | |
| 2013/0001158 A1 | 1/2013 | Condon et al. | |
| 2013/0056399 A1 | 3/2013 | Downare | |
| 2013/0092632 A1 | 4/2013 | Allard | |
| 2013/0105387 A1 | 5/2013 | Antoinette et al. | |
| 2013/0180903 A1 | 7/2013 | Kowalsky | |
| 2014/0001127 A1 | 1/2014 | Hymel et al. | |
| 2014/0124424 A1 | 5/2014 | Chai et al. | |
| 2014/0202954 A1 | 7/2014 | Lassovsky | |

OTHER PUBLICATIONS

PCT, Notification Concerning Transmittal of International Preliminary Report on Patentability (Chapter I of the Patent Cooperation Treaty) for International Application No. PCT.US2010/030206, dated Oct. 20, 2011.

Contech Construction Products Inc., UrbanGreen™ BioFilter Design, Operation and Performance, 2009.

Contech Construction Products Inc., UrbanGreen™ BioFilter Specification, Apr. 2009.

Contech Construction Products Inc., UrbanGreen BioFilter UGBF0406 Standard Detail, with date Dec. 2, 2010.

Contech Construction Products Inc., UrbanGreen BioFilter UGBF0406-NC Standard Detail, with date Dec. 2, 2010.

Contech Construction Products Inc., UrbanGreen BioFilter UGBF0608 Standard Detail, with date Dec. 2, 2010.

Contech Construction Products Inc., UrbanGreen BioFilter UGBF0608-NC Standard Detail, with date Dec. 2, 2010.

Contech Construction Products Inc., UrbanGreen BioFilter UGBF0612 Standard Detail, with date Dec. 2, 2010.

Contech Construction Products Inc., UrbanGreen BioFilter UGBF0612-NC Standard Detail, with date Dec. 2, 2010.

Contech Construction Products Inc., UrbanGreen BioFilter UGBF0816 Standard Detail, with date Dec. 2, 2010.

Contech Construction Products Inc., UrbanGreen BioFilter UGBF0816-NC Standard Detail, with date Dec. 2, 2010.

Third-Party Preissuance Submission Under 37 CFR 1.290 filed in the USPTO on Oct. 30, 2012 in connection with U.S. Appl. No. 13/214,230.

Third-Party Preissuance Submission Under 37 CFR 1.290 filed in the USPTO on Feb. 4, 2013 in connection with U.S. Appl. No. 13/214,230.

U.S. Patent and Trademark Office, file history excerpts from U.S. Appl. No. 12/977,015 (51 pages).

"Service Plaza Stormwater Project," Government Engineering, 40-41, May-Jun. 2007.

U.S. Patent and Trademark Office, file history excerpts from U.S. Appl. No. 13/263,291 (379 pages), dated 2013.

Rain Guardian, "Four Stages of Pretreatment (U.S. Pat. No. 8,501,016),"screen shots form http://www.rainguardian.biz/index.php?option=com_content&view=artical&id=66&itemid=103, printed on Jan. 2, 2014, 2 pages.

(56) References Cited

OTHER PUBLICATIONS

Tree Hill Stormwater Systems, slides entitled "Gray Complements Green, Gray + Green Treatment Train Design: Targets Multiple Urban Pollutants Reduces Maintenance Costs Extends Useful Life of Green Infrastructure Minimizes Urban Blight Enhances Quality of Urban Life," dated Oct. 10, 2012, downloaded on Jan. 2, 2014 from http://berkscd.com/wp-content/uploads/2012/10/Gray-Complements-Green.pdf, 8 pages.
Americast,"Standard Detail—4' Wide Precast Filterra Curb Inlet with Internal Bypass,"DWG: STD_4_FTCB, dated Mar. 3, 2011.
Americast, "Standard Detail—6' Wide Precast Filterra Curb Inlet with Internal Bypass," DWG: STD_6_FTCB, dated Mar. 3, 2011.
Americast, "Standard Detail—8' Wide Precast Filterra Curb Inlet with Internal Bypass," DWG: STD_8_FTCB, dated Mar. 3, 2011.
Americast, "Standard Detail Gutter and Curb Opening Filterra Curb Inlet with Internal Bypass," DWF: DTL_FTCB_GCO, dated Apr. 4, 2011.
"Filterra Curb Inlet with Internal Bypass Design Guidelines California Region," Undated.
"Filterra Curb Inlet with Inernal Bypass General Notes," Undated.
Filterra, "Sizing Table for 4' Wide Vault Filterra Curb Inlet with Internal Bypass," "Sizing Table for 6' Wide Vault Filterra Curb Inlet with Internal Bypass," "Sizing Table for 8' Wide Vault Filterra Curb Inlet with Internal Bypass," undated.
Kristar Enterprises, Inc., "TreePod Biofilter with Internal Bypass (End Inlet),"Drawing No. TPB-IB-0001, dated Mar. 13, 2009.
Kristar Enterprises, Inc., "TreePod Biofilter with Internal Bypass (Side Inlet), "Drawing No. TPB-IB-0002, dated Mar. 13, 2009.
Kristar Enterprises, Inc., "TreePod Biofilter with Enternal Bypass (End Inlet), "Drawing No. TPB-XB-0001, dated Mar. 13, 2009.
Kristar Enterprises, Inc., "TreePod Biofilter with External Bypass (Side Inlet), "Drawing No. TPB-XB-0002, dated Mar. 13, 2009.
U.S. Patent and Trademark Office, file history excerpts from U.S. Appl. No. 13/214,230 (60 pages), dated 2014.
PCT International Search Report and Written Opinion for International Application No. PCT/US 2014/042077, dated Aug. 12, 2014 (11 pages).

\* cited by examiner

TREE BOX FILTER WITH HYDROMODIFICATION PANELS

CROSS REFERENCE TO RELATED APPLICATIONS

This application claims the benefit of U.S. Provisional Application No. 62/094,540 filed on Dec. 19, 2014, the subject matter of which is herein incorporated by reference in its entirety.

FIELD OF THE INVENTION

The present invention relates to assemblies and methods that are useful for the control of stormwater runoff and the removal of pollutants, debris, and other contaminants from stormwater runoff; and more specifically, bioretention assemblies and methods systems that are useful for managing stormwater flow and inhibiting the flow of pollutants, debris, and other contaminants into drainage systems.

BACKGROUND OF THE INVENTION

Tree box filters, which are also known as tree box planters, function as bioretention systems for managing and filtering stormwater runoff. They are a well-known Low Impact Design ("LID") approach to mitigating the impacts of hydromodification, impervious surfaces, and the general alteration of flow, and to managing the flow of stormwater runoff on developed land. Bioretention systems utilize soils and both woody and herbaceous plants to remove pollutants, including ultra-fine and dissolved pollutants, from stormwater runoff close to their source. The systems mimic the natural (i.e., pre-development) stormwater flow from the land.

Tree box filters can be used to treat stormwater that has run over impervious surfaces at commercial, residential, and industrial areas, such as in parking lot islands, roads, and median strips. In a conventional tree box filter, stormwater runoff flows into an in-ground or above ground vault-shaped container filled with bioretention media, including mulch and engineered soil. The container also includes a native, non-invasive tree, shrub, or other vegetation. Runoff can be diverted to the bioretention area, either directly or by a curb or gutter system.

As water infiltrates through the tree box filter and the tree box filter temporarily stores runoff water, the bioretention media captures particulate matter, including ultra-fine and dissolved pollutants, and allows the treated stormwater to percolate through the system. Filtered runoff can sometimes be collected in an underdrain, which consists of a perforated pipe in a gravel layer installed along the bottom of the filter bed. The stormwater eventually exits through one or more outlet openings in the container into a drainage system or water retention/storage system.

One of the concerns that has emerged is the ability of tree box filters to accommodate infiltration. In areas suitable for infiltration, tree box filters can be designed to allow runoff to infiltrate into the surrounding soils from the ground surface. Infiltration can be desirable, for example, in areas with permeable surrounding soils. Stormwater exits the vault-shaped container through an open bottom structure that allows for infiltration to the subgrade. The tree box filter's open bottom structure, however, limits the ability of the vault-shaped container to hold the bioretention media, gravel, and other container materials within the vault, before it is delivered and installed at a given site or landscape area. Additional space is thus needed to store the materials before delivery and installation. Because separate site visits may be required to install the media, additional space, coordination, time, fuel, labor, and other resources may be required to transport the materials during delivery of the system. Additional time and labor may also be needed to separately load, unload, and carry the bioretention media and container materials after they are delivered to a construction site.

Another concern is the ability of bioretention systems, including conventional tree box filters, to process large quantities of fluid during peak flow periods without having backups that result in localized flooding of the surrounding areas. Most bioretention systems will have an upper limit for the amount of water that can be filtered at any time, as well as a maximum capacity for the amount of water that can be passed through the system in any event. Once the capacity of the system is exceeded, stormwater can pool at the surface of the planting soil.

It may be advantageous to incorporate one or more high flow bypass mechanisms into a tree box filter. To address stormwater flow during periods of peak flow and increase the upper limit for fluid flow, some bioretention systems employ an external high-flow bypass mechanism. The feature allows excess fluids to proceed through the drainage system without being filtered during periods of high fluid flow. This conventional high flow bypass is a separate structure, often a separate catch basin or similar device connected to the tree box filter by an external pipe or other mechanism and located downstream from the system. However, because the high flow bypass is an external structure—externally added to the tree box or other bioretention system components—its incorporation with tree box filters requires additional space (to accommodate the external bypass structure), as well as additional design, manufacturing, installation, and maintenance costs.

Another concern is the ability of the bioretention system to remove gross pollutants from incoming stormwater prior to releasing it. Ideally, the bioretention system should pretreat (e.g., using filtration systems) water flow from the developed land prior to releasing it. The entrance of gross pollutants, such as trash, debris, floatables, and coarse sediments, are known to "clog" the system and thus reduce the efficiency. It also increases the maintenance frequency of typical bioretention systems. Pre-treatment apparatus that can remove gross pollutants from the treated flows should be incorporated into the bioretention system in order to minimize land usage. The pretreatment apparatus also should be accessible for intermittent cleaning, repair, and/or other maintenance.

Further, bioretention systems typically are installed under large concrete or asphalt surfaces to treat stormwater that has run over impervious surfaces in commercial, residential, and industrial areas such as median strips, parking lots, and sidewalks. They must be structurally sound and capable of bearing highly variable weight loads. It is desirable for the systems to maximize water storage while occupying as small a "footprint" as possible to minimize land usage and site excavation costs.

Accordingly, what is desired is a bioretention system solving some or all of the foregoing problems, including a bioretention system that can allow for stormwater infiltration into the surrounding soil, while reducing material loading, transportation, and storage costs. It is another objective of the invention to provide for a bioretention system that can effectively process increased amounts of stormwater runoff during peak periods of high fluid flow and can efficiently utilize space within a developed land site. It is another objective of the invention to provide a bioretention system that has pre-filtration capabilities to remove gross pollutants from stormwater runoff before it is released. It is yet another objective of the invention to provide a flexible and economical design that simplifies the design and construction of stormwater drainage systems in a landscape area.

BRIEF SUMMARY OF THE INVENTION

The present invention is directed generally to a sustainable low impact design for stormwater management. In one embodiment, the assembly comprises an inlet chamber comprising an inlet port, a treatment port, and a bypass port; a treatment chamber adjacent to a first side of the inlet chamber and comprising biofiltration material; an outlet chamber adjacent to a second side of the inlet chamber and comprising an outlet port; and a bottom member disposed along a bottom portion of the treatment chamber. The bottom member comprises a substantially pervious region embedded within a substantially impervious region. The treatment port is adapted to direct stormwater to the treatment chamber, and the bypass port is adapted to directed overflow stormwater to the outlet chamber.

In some embodiments of the present invention, the treatment port may comprise an interior opening in the inlet chamber. The bypass port may comprise an upper weir and a lower weir in the inlet chamber. The upper and lower weirs may extend into an interior of the inlet chamber. The inlet chamber may comprise a side wall, and the upper and lower weirs are disposed within a side wall of the inlet chamber. As will be further described, the elevation of the inlet and outlet ports may be variable. The inlet chamber may also comprise a pre-treatment screen attached to the treatment port. The inlet chamber may further comprise a tray disposed below the treatment port and adapted to direct excess fluid flow to an intermediate chamber. The present invention may also comprise a substantially horizontal tray disposed below the treatment port, the tray comprising a false floor in the inlet chamber and a bypass weir extending substantially vertically from a bottom surface of the tray. In yet other embodiments, the assembly may also comprise a recess extending below an upper surface of the bottom member.

In the treatment chamber, the substantially pervious region may comprise a plurality of panels that are adapted to permit fluid flow, while restricting the passage of gravel and underdrain material therethrough. In some embodiments, the plurality of panels may be integral to the substantially impervious region. In other embodiments, the plurality of panels may be connected to the substantially impervious region. The substantially pervious region may comprise a plurality of removable panels. The substantially pervious region may further comprise a plug overlying at least a portion of the substantially pervious region. The treatment chamber may further comprise an underdrain pipe disposed along a lower portion of the treatment chamber.

In another embodiment, the present invention provides an assembly for use in a bioretention system comprising: four side walls disposed to form a substantially rectangular vault; along with an inlet chamber disposed within the four side walls, the inlet chamber comprising an inlet port, a treatment port, and a bypass port. The assembly further comprises a treatment chamber adjacent to the inlet chamber, the treatment chamber comprising biofiltration material; an outlet chamber adjacent to the inlet and treatment chambers, the outlet chamber comprising an outlet port; and a bottom member adjoining at least two side walls and comprising a substantially pervious region embedded within a substantially impervious region. Stormwater flow within the capacity of the treatment chamber is directed to the treatment chamber through the treatment port, while stormwater flow exceeding the capacity of the treatment chamber is directed to the outlet chamber through the bypass port.

In yet other embodiments, the present invention provides an assembly for use in a bioretention system comprising: a first compartment, second compartment, and third compartment. The first compartment comprises an inlet opening, an upper weir extending from an upper portion of the first compartment, a lower weir extending from a lower portion of the first compartment, and an interior passage for stormwater flow. The second compartment is downstream from the first compartment and adapted to receive stormwater from the interior passage of the first compartment. The second compartment comprises a bottom frame member adjoining edges of the vault, wherein the bottom frame member comprises a plurality of substantially permeable panels. The third compartment is downstream from the second compartment and adapted to receive stormwater passing the upper and lower weirs. The third compartment comprises an outlet opening.

Other embodiments of the present invention disclose a method of treating stormwater in a bioretention system comprising the steps of: flowing stormwater through an assembly comprising: an inlet chamber comprising an inlet port, a treatment port, and a bypass port; a treatment chamber adjacent to the inlet chamber along a first side and comprising biofiltration material; an outlet chamber adjacent to the inlet chambers along a second side and comprising an outlet port; and a bottom member disposed along a bottom portion of the treatment chamber, the bottom member comprising a substantially pervious region embedded within a substantially impervious region. Stormwater within the capacity of the treatment chamber may be directed through the treatment port and to the treatment chamber of the assembly. Stormwater exceeding the capacity of the treatment chamber may be directed to the outlet chamber through the bypass port of the assembly. In some embodiments, the method further comprises the step of: infiltrating at least a portion of the stormwater collected in the treatment chamber through at least one panel and to the surrounding soils or a downstream stormwater treatment system.

The present invention further provides an underground stormwater management system comprising a vault-shaped tree box filter. The tree box filter comprises four side walls and a bottom slab, which house an inlet gallery, a media area adjacent to the inlet gallery, an outlet gallery disposed below the inlet gallery. The tree box filter further comprises a recess in the bottom slab that defines a void space below an upper surface of the bottom slab. The bottom slab may comprise one or more openings or a solid floor slab. The recess is in fluid communication with underlying materials on which the tree box rests (e.g., base rock and/or surrounding soils) through one or more fluid conveying apparatuses disposed within the tree box filter. In one embodiment, the fluid conveying apparatus may comprise a substantially vertical pipe disposed within the outlet gallery. The substantially vertical pipe may be connected to an underdrain pipe in the media area. In another embodiment, the fluid conveying apparatus may comprise an opening in the media area below an upper surface of the bottom slab.

BRIEF DESCRIPTION OF THE DRAWINGS

Embodiments of the present invention may be described with reference to the accompanying drawings.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one, and the singular also includes the plural unless it is obvious that it is meant otherwise.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless otherwise defined, all technical and scientific terms used herein have the same meaning as commonly understood by one of ordinary skill in the art to which this invention belongs. Although methods similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

In the following description, numerous specific details are provided, such as the identification of various system components, to provide an understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

I. General Structures

The present invention provides a bioretention system, such as a tree box filter, for stormwater management applications. A wide range of stormwater management applications may be addressed using the system described herein. These include but are not limited to controlling and treating stormwater flow in parking lot islands, traffic islands, median strips, sidewalks, and swales. The bioretention system can be installed in newly developed or re-developed land or retrofitted in developed sites.

A. Tree Box Filter Vault Assemblies

The bioretention system of the present invention provides a container having biofiltration media and infiltration capacity. In one embodiment, the bioretention system provides a vault-shaped structure with four substantially upright exterior walls that surround an enclosed space. The vault-shaped structure comprises chambers for stormwater flow. Biofiltration media may be placed in at least one of the chambers to filter at least a portion of stormwater runoff flowing through the structure. The vault also contains one or more panels with one or more openings along at least one bottom portion of the vault to allow for infiltration or exfiltration through that portion of the vault.

Figure 1:
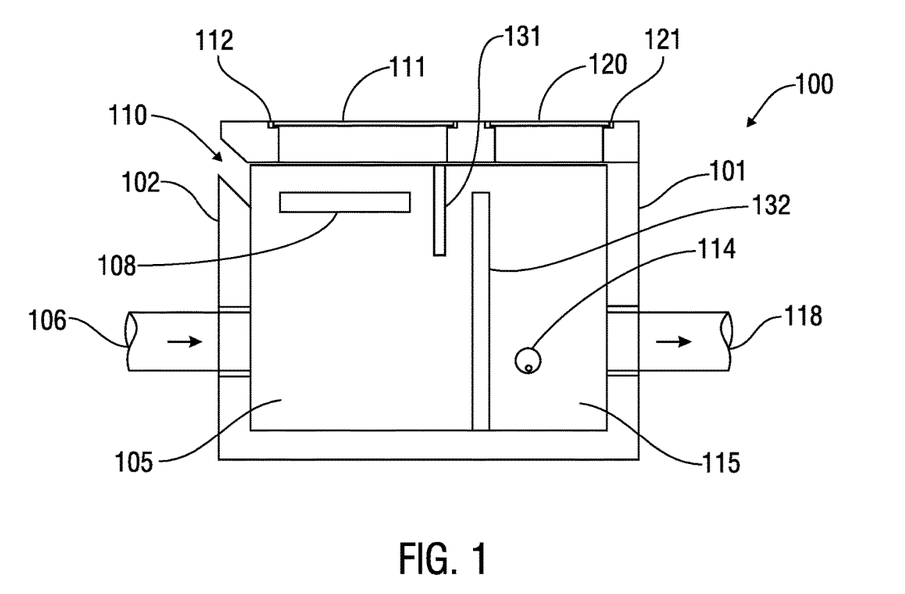
FIG. 1 illustrates schematically a cross-sectional side view of a tree box filter according to one embodiment of the present invention with an inlet chamber and an adjacent outlet chamber.
Figure 2:
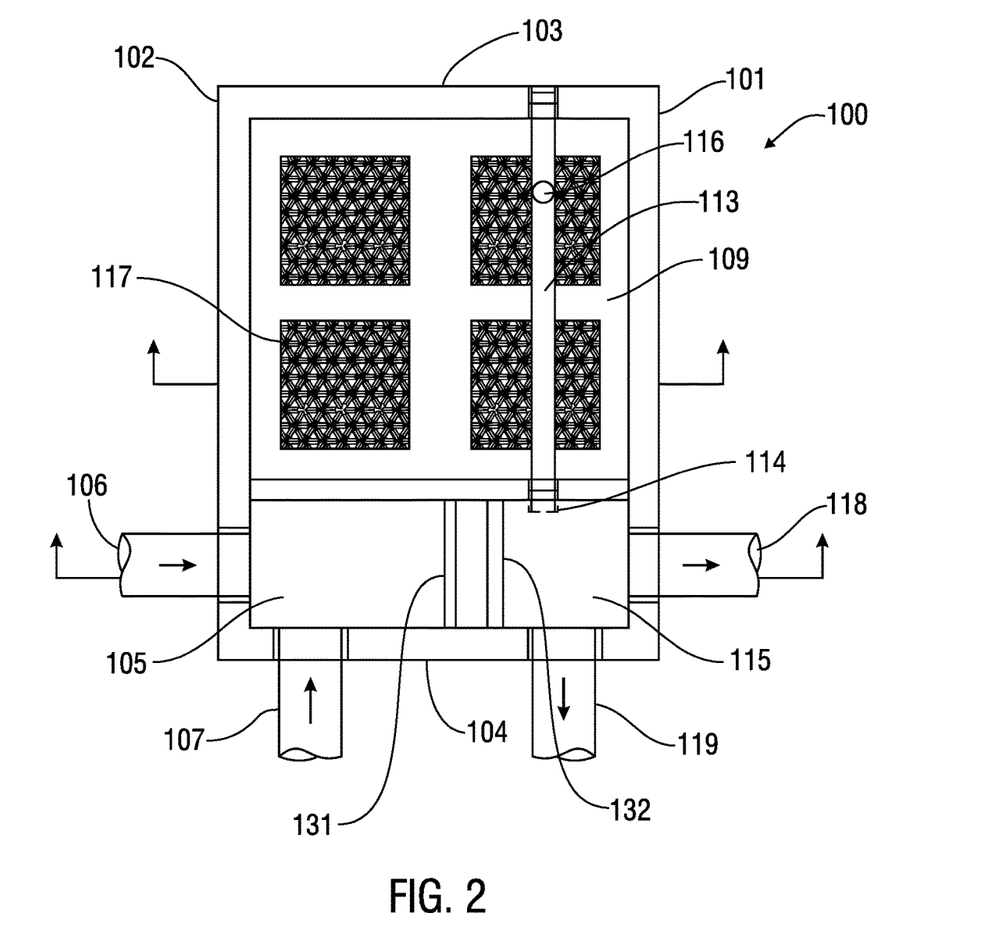
FIG. 2 illustrates schematically a cross-sectional top view of a tree box filter according to one embodiment of the present invention with an inlet chamber, outlet chamber, and a treatment cell. Four substantially permeable panels and an underdrain pipe are disposed along bottom portions of the treatment cell.

FIGS. 1 and 2 illustrate schematically cross-sectional side and top views, respectively, of one embodiment of the tree box filter 100 having multiple chambers for stormwater flow. Longitudinal side walls 101 and 102 are substantially orthogonal to traverse side walls 103 and 104 to form a substantially rectangular-shaped vault. The side walls at least partially define one or more internal chambers within the vault.

An inlet chamber 105 is located along one side of the vault. The inlet chamber may include one or more inlet openings along a side wall, as well one or more inlet pipes 106, 107 through which stormwater can enter the vault.

In some embodiments, the inlet chamber includes an interior wall opposite the traverse side walls. An interior opening 108 along the interior wall of the inlet chamber allows stormwater to flow to an adjacent treatment cell 109, which can contain biofiltration media (not shown). In a preferred embodiment, the interior opening may be at least partially obstructed by an optional filter structure, such as a pretreatment screen or mesh (not shown), which helps to prevent the passage of gross pollutants, debris, trash, and other large particles to the treatment cell and filters incoming stormwater before it enters the treatment cell. In some embodiments, the inlet chamber can also include an optional exterior opening 110 to accommodate placement of the tree box filter at or near a gutter or curb inlet. The exterior opening can provide a further inlet for fluid flow from a curb or gutter into the inlet chamber. Along an upper portion of the inlet chamber, a moveable cover panel 111 or grate may be supported by a frame structure 112.

The treatment cell 109 may be filled with filtration material. Typically, filtration material will be a blend of several constituents that is covered by a mulch layer. The constituents sit on top of a gravel layer. Each of the layers in the treatment cell may comprise a range of bioretention materials known in the art (e.g., fine and coarse sediment, sand, and/or engineered soil). At least a portion of stormwater entering the tree box filter is allowed to infiltrate the bioretention area in the treatment cell, where it is filtered and treated. In some applications, it may be advantageous to install a perforated underdrain pipe 113 along a lower portion of the treatment cell. The underdrain pipe runs through an interior orifice along a side wall of the treatment cell, to an underdrain outlet 114. Treated stormwater, which has percolated through the treatment cell to the underdrain pipe, flows though the underdrain outlet and to the outlet chamber 115. In some embodiments, the underdrain pipe may include an opening 116 that may be connected to a cleanout pipe that stands substantially vertically and is accessible from outside the vault. The underdrain cleanout pipe provides above-ground access to the underdrain pipe for maintenance, de-clogging, and cleanout of the underdrain pipe. A bottom portion of the treatment cell includes one or more substantially permeable panels 117, through which treated stormwater may infiltrate the surrounding soils. The substantially permeable panels may be positioned in various configurations along the bottom portion of a tree box filter.

In this embodiment, an outlet chamber 115 is located on another side of the vault, adjacent to the inlet chamber 105 and treatment cell 109. The outlet chamber is partially defined by at least one interior wall or interior partial wall opposite the traverse side walls of the tree box filter. The interior wall of the outlet chamber may be an extension of the interior wall of the inlet chamber (described above), or it may be a separate wall, separate from the interior wall of the inlet chamber. The outlet chamber also includes one or more outlet openings along with outlet pipes 118, 119 through which stormwater can exit the vault. In some embodiments, the outlet chamber also receives stormwater flowing through an underdrain pipe via one or more underdrain orifices, as described above.

An upper portion of the outlet chamber also includes a moveable cover panel 120 supported by a frame structure 121. The cover panel and frame structure allow for access, maintenance, inspection, and cleanout of the outlet chamber. These components may be integrally formed with an upper portion of the tree box filter, or they may be separate components connected to the upper portion using one of a number of connection structures known in the art, such as, without limitation, one or more bolts, screws, clips, hinges, fasteners, or pins.

The tree box filter of the present invention can be installed underground in a landscaped area and filled with filtration material, including a tree, and underdrain material. Stormwater runoff flows through one or more inlet openings, including through one or more inlet pipes or a curb inlet, into the inlet chamber of the tree box filter. "First flush" flow accumulates in the inlet chamber until it reaches the height of the interior opening in the inlet chamber. Once it reaches the height of the interior opening, the stormwater runoff flows through the interior opening, with or without a pre-treatment screen, and is captured in the adjacent treatment cell, where at least some of the stormwater percolates downward through the filtration material. A portion of the treated stormwater may then flow through the underdrain material, into a perforated underdrain pipe, and into the outlet chamber, where it may be released to a drainage or other underground stormwater management system. Another portion of the treated stormwater may be allowed to infiltrate through one or more substantially permeable panels along a bottom portion of the tree box, and to the surrounding soil.

Figure 3:
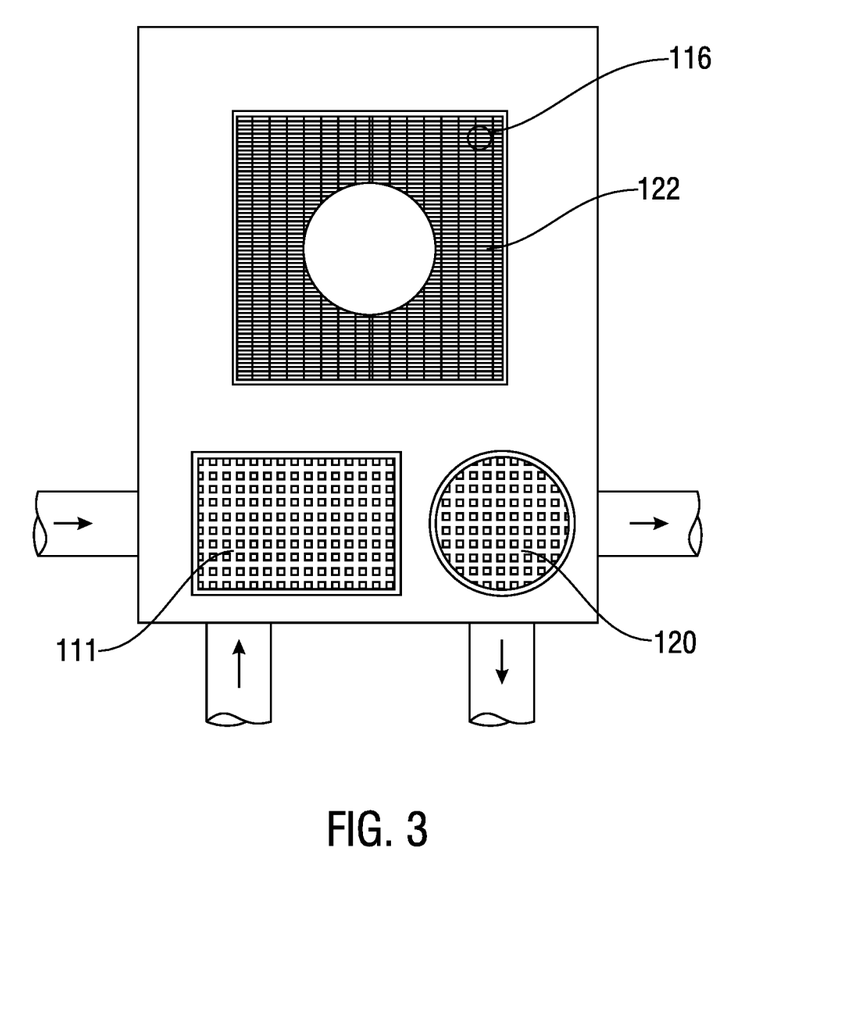
FIG. 3 illustrates schematically a top plan view of a tree box filter according to one embodiment of the present invention with a frame and grate assembly disposed above the treatment cell, as well as a frame and cover disposed above each of the inlet and outlet chambers.

During heavy stormwater events, stormwater exceeding the capacity of the treatment cell bypasses the treatment cell and is captured in the outlet chamber. The overflow is released through one or more outlet pipes into a stormwater management system. Moveable cover panels 111, 120 and/or grate assemblies 122 accessible from above ground (as shown in FIG. 3) allow access for maintenance, de-clogging, and cleanout of the underlying chambers. The underdrain pipe that runs along the lower portion of the treatment cell may also include a substantially vertical clean out pipe, connected to an opening 116 along the underdrain pipe, that provides access for maintenance, de-clogging, and cleanout of the underdrain pipe above ground.

The ordinary artisan will also recognize that the absolute dimensions of the inlet and outlet openings can be selected to accept industry standard pipe connections/fittings. In this embodiment shown in FIGS. 1 and 2, the openings are shown as substantially rounded. However, any of a multitude of complimentary shapes allowing fluid flow through the tree box filter and well known to the ordinary artisan could be used. Such fittings can offer flexible and watertight connections into and from the tree box filter and piping for controlling water flow into and out of the tree box filter.

B. Permeable Panels

As discussed above, a bottom portion of the tree box filter may include one or more substantially permeable panels in various configurations. As shown in the embodiment of FIG. 2, a grid of substantially permeable panels may be located along a bottom portion of the treatment cell.

In a preferred embodiment, the substantially permeable panels may be constructed of molded plastic. In other embodiments, the panels may be constructed of fiberglass or concrete material with an open matrix. Alternatively, the panels may be formed from wire mesh, screen, grating, or any other substantially permeable material known in the art to allow the passage of fluid. In a preferred embodiment, the substantially permeable panels are constructed of lightweight and durable material to facilitate transport, while providing structural integrity and load carrying capacity for containing filtration, underdrain, and other materials that are conventionally used in tree box filters (e.g., fine and coarse sediment, sand, and gravel). As such, they allow the placement of the materials, for instance as loose material, in bags, or in other transport containers, within the tree box filter at the manufacturing facility and during loading, transportation to job sites, and storage.

The substantially permeable panels include openings that are sized to allow the flow of stormwater, while at least partially obstructing the passage of large particles, including without limitation some or all of the filtration, underdrain, and/or other treatment cell materials. As such, the substantially permeable panels help to reduce the amount of sediment and other material that passes to the surrounding soil.

They allow for infiltration of stormwater to the surrounding area, while providing structural support and the retention of other contents (e.g., sediment) of the treatment cell within the tree box filter. This added flow capability is particularly useful in increasing infiltration, decreasing runoff, and otherwise avoiding, minimizing, or reducing the effects of hydromodification in urban and developed areas.

In particular applications, the openings of the substantially permeable panels may be sized to retain drain rock or other types of drainage gravel that are well-known and commonly used in construction projects, along with fines that may work their way into the underdrain layer and "clog" the underlying filtration system and/or native soils if allowed to pass through the panels. As a non-limiting example, in construction projects using conventional ¾-inch (approximately 19-mm) drain rock, the apparent opening size in the panels may be approximately 19 to 0.10 mm to prevent passing underdrain rock and/or to provide additional filtration as needed for the construction project.

The sizes discussed above are provided for illustrative purposes and are not intended to limit the scope of the invention. The ordinary artisan will recognize that the size of the panel openings and dimensions of the panels can be varied based on the range of design options available, such as, without limitation: the water management application, characteristics of the underdrain material used, desired underdrain material and/or media retention, desired fine filtration, and/or desired flow rates through the tree box filter. For example, smaller opening sizes may be selected when an application seeks to retain finer underdrain materials with an increased amount of fine particles, while larger opening sizes may be desired when incorporating coarser underdrain materials with a reduced amount of fine particles.

In some embodiments, the panels can facilitate stormwater infiltration to another chamber, other infiltration components, or another stormwater management system. For example, the system may be designed to deliver stormwater from the substantially permeable panels to one or more layers of base rock. The substantially permeable panels may also permit stormwater flow to an anaerobic chamber downstream from the treatment cell. The anaerobic chamber may be contained within the structure above the bottommost surface but below the underdrain pipe and/or the treatment media or be situated outside the structure within a subbase supporting the structure and/or within a separate structure designed to enhance anaerobic treatment of stormwater. In some embodiments, the substantially permeable panels may lead to an adjacent stormwater retention or detention system. The panels may also provide for additional filtration or treatment by incorporating, for example, filtration material that promotes the growth of microbes that further remove contaminants from stormwater.

In some embodiments, the substantially permeable panels may be integrally formed with a bottom structure of the tree box filter. For example, a tree box filter may include a bottom structure with substantially impermeable regions adjoining side walls of the tree box filter and one or more substantially permeable regions formed from a grid of panels molded into the bottom structure. The substantially permeable region may include substantially permeable panels separated by a frame structure, as shown in FIG. 2.

In other embodiments, the substantially permeable panels may be separate components that are connected to a bottom structure of the tree box filter using fasteners, clips, screws, hinges, or other connecting structures known in the art. The substantially permeable region may alternatively include interlocking-panels directly adjoining each other (not shown). In yet other embodiments, the substantially permeable panels may be separate "drop-in" components. For example, the one or more panels may rest along recesses in the bottom structure, either directly or through the use of intermediate structures such as frames, spacers, or adapters.

Figure 4:
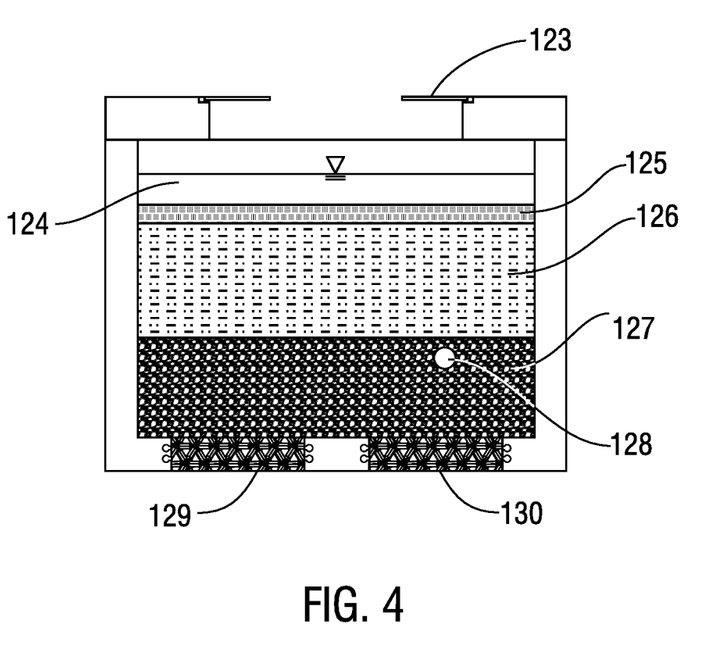
FIG. 4 illustrates schematically a cross-sectional side view of a treatment cell according to one embodiment of the present invention. The treatment cell includes a layer of mulch, biofiltration media, and underdrain gravel. An underdrain runs along a bottom portion of the chamber. When installed in a landscape area, substantially permeable panels along another bottom portion to allow for infiltration of stormwater to the surrounding area.

In a preferred embodiment, the substantially permeable panels are positioned substantially along the same plane as the frame structure or bottom structure and substantially flush with the outer (downward facing) surface of the frame structure or bottom structure. FIG. 4 illustrates schematically a cross-sectional side view of one embodiment of a treatment cell of the present invention. A frame and grate 123 rest along a top surface of the cell. A tree (not shown) may be planted through the opening in the grate. In this example, the treatment cell includes a ponding layer 124 followed by a mulch or organic layer 125, biofiltration media 126, and an underdrain gravel layer 127. An underdrain orifice 128 accepts the passage of an underdrain pipe along a bottom portion of the treatment cell. In this embodiment, substantially permeable hydromodification panels 129, 130 with embedments to secure the panels are flush with the outer surface of the bottom frame structure. In other embodiments, however, the substantially permeable panels may be positioned along a different plane from the frame structure, and they may extend above or below the outer surface of the frame structure or bottom structure.

As described in the above embodiments, the substantially permeable panels are generally rectangular in shape and form a repeating grid pattern along a bottom portion of the treatment cell. The panels, however, can be in a range of customized shapes (e.g., circular, oval, generally round, or irregular), configurations, and sizes to fit different applications. The panels may also be placed in different numbers, patterns, or irregular configurations to meet the needs of a particular landscaped area. For example, a bottom portion of the tree box filter of the present invention can be designed with different combinations of open, partially open, or closed regions that allow or restrict fluid flow through the tree box filter, to accommodate the needs of a particular site or system. One or more panels may comprise watertight material. Moreover, panels can be used together in different configurations to form underground stormwater management systems that either allow or impede the flow of fluid through that portion of the system.

In some embodiments, the substantially permeable panels may be at least partially removable to facilitate tree box filter customization, component replacement, component removal, access, and/or cleaning. In some applications, it may be desirable to replace one or more of the substantially permeable panels with one or more substantially impermeable covers, panels, seals, or "plugs" to allow use of a given tree box filter in an area where infiltration is not advantageous or no longer suitable.

In other applications, the infiltration rate of a tree box filter also may be adjusted by adjusting the size of the passages or flow openings in the panels. For example, to increase the infiltration rate, one or more substantially permeable panels may be removed and replaced with one or more substantially permeable panels with larger flow openings, or substantially permeable panels with an increased number of openings. The use of larger flow openings in the substantially permeable panels provides the advantage of minimizing surfaces that debris flowing through the tree box filter can become snagged or otherwise caught resulting in obstructions. In some embodiments, the area on which panels may be placed can be left unobstructed allowing water and/or air to flow through. In yet other applications, one or more substantially permeable panels may be replaced with a combination of substantially impermeable covers, panels of greater or reduced permeability, and unobstructed openings.

In some instances where reduced permeability or stormwater detention (storage) may be desired, the tree box filter of the present invention may be used with a liner that restricts the passage of fluid therethrough. For example, the liner may be semi-permeable and be constructed of a geotextile or other fabric with reduced permeability compared to that of the panels installed in a given tree box filter. Alternatively, the liner may be substantially impermeable to fluid flow and be constructed of suitable material, such as PVC plastic. In other embodiments, to allow for rain water harvesting for example, the system can be encased in non-permeable liner.

B. Recessed Bottom Slab

In another embodiment, the bottom portion of the tree box filter may also include a recess in the bottom slab below the area where one or more permeable panels may rest. In addition to use with tree box filters having permeable panels, the tree box recess of the present invention may be used with tree box filters that do not implement permeable panels.

The recess may be constructed of varying sizes and positioned shapes in different areas of a tree box filter. As such, it may be used with a wide range of different tree box filter designs. For example, the recess may be incorporated into a tree box filter with a solid or partially solid floor slab. Alternatively, the recess may be incorporated into a tree box filter with an open bottom slab. The recess in the bottom slab forms a void space along a lower portion of the tree box filter. The void space is designed to allow for the storage and passage of stormwater from the tree box filter to the base rock underlying the tree box filter, thereby promoting infiltration of stormwater to the surrounding area Referring to the examples illustrated in FIGS. 6A and 6B, tree box filter 200 includes a concrete vault. A tree grate 201 and solid cover 202 are located along an upper portion of the vault. The upper portion of the vault also includes a curb inlet overhang 203. The vault has an open throat curb inlet with exposed rebar 204 along with an opening 205 for an outlet pipe 206.

Figure 6A:
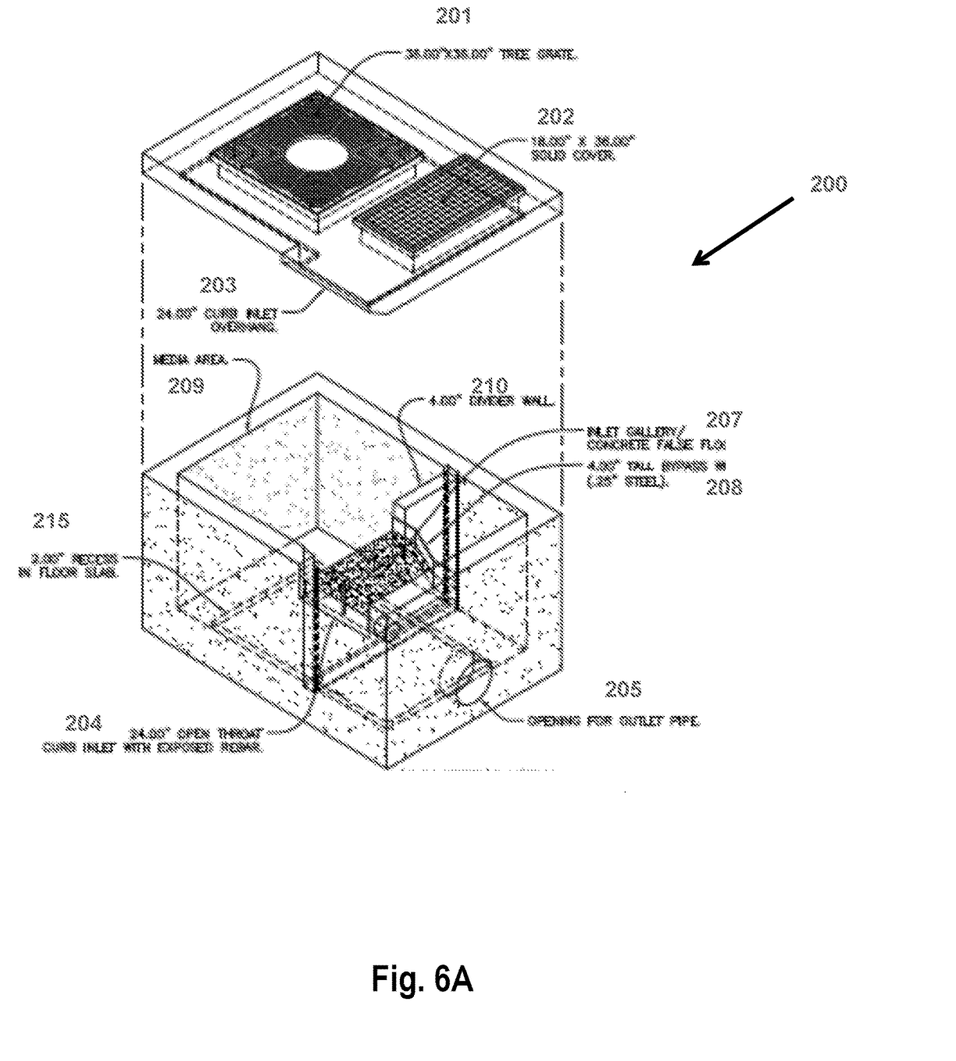
FIG. 6A illustrates schematically a perspective view of a tree box filter with a recess in the bottom slab, in accordance with another embodiment of the present invention. The underdrain, clean-out, and outlet assemblies are not shown in this view.
Figure 6B:
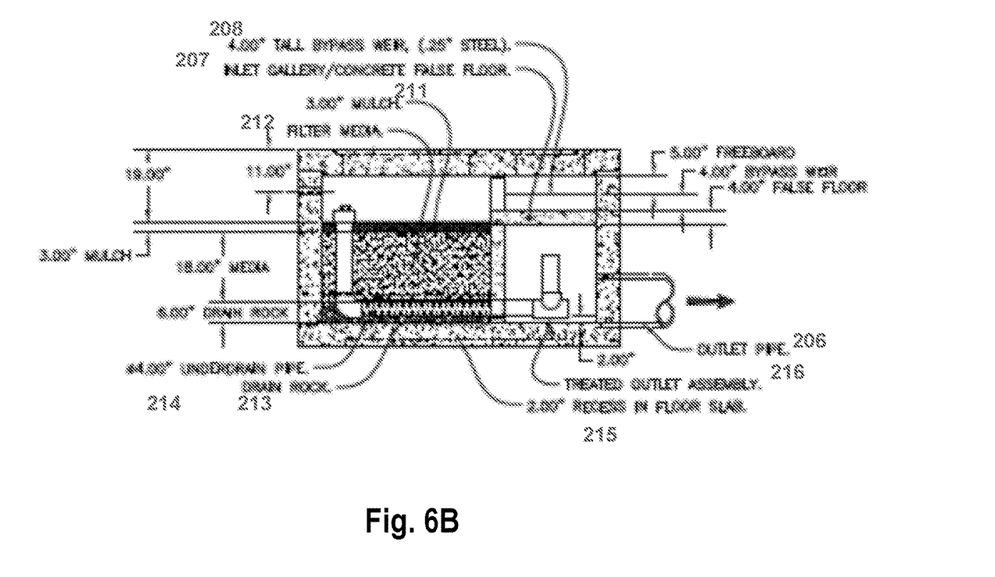
FIG. 6B illustrates schematically a side cross-sectional view of the tree box filter shown in FIG. 6A, including underdrain, clean-out, and outlet assemblies.

When the tree box is installed in a landscaped area, stormwater may enter the vault through one or more inlet openings, including the curb inlet, and pass through an inlet gallery with a concrete false floor 207. A bypass weir 208 first directs flows accumulating in the inlet galley to the adjacent media area 209, which is separated from the inlet and outlet areas of the vault by a divider wall 210. The media area may include surrounding walls and a bottom slab housing filtration materials known in the art, for example, an upper layer of mulch 211, followed by biofiltration media 212, and a lower layer of drain rock 213. Stormwater in the media area is allowed to percolate through the media area to the drain rock. Overflows exceeding the capacity of the media area are directed over the bypass weir and into the neighboring outlet area, from which it subsequently is released to an underground drainage or other stormwater management system.

In this example, treated stormwater from the media area may be carried by a perforated underdrain pipe 214 running substantially horizontally along a bottom of the media area, past the divider wall, and to the outlet area for release through an outlet pipe 206.

The media area may include one or more structures in one or many possible configurations to facilitate stormwater flow through a recess 215 in the bottom slab. As a non-limiting example, the perforated underdrain pipe may have a T-junction 216 that connects to a substantially vertical pipe that is in fluid communication with the recess. At least some of the treated stormwater entering the tree box filter is allowed to flow through the vertical pipe to the recess and infiltrate through the base rock below the vault (e.g., by flowing through an opening below an upper surface of the bottom slab in the outlet compartment and/or by flowing through the underdrain pipe).

As shown in this example, the recess 215 in the bottom slab forms a void space in the lower portion of the vault. This additional space allows for the storage of treated stormwater between the bottom portion of the vault and base rock on which the vault rests. The recess may also increase the surface area of the base rock that is exposed to stormwater to increase infiltration to the surrounding soils.

It is contemplated that any of a multitude of complementary structures that allow fluid flow and well known to the ordinary artisan; such as T-junctions, pipes, other piping, cavities, or openings placed in different locations in the tree box (e.g., the media are or the outlet compartment) could be used to convey stormwater entering the tree box filter to the recessed area. Such structures can offer flexible connections and piping for controlling water flow into and out of an assembly.

As discussed, the recess may also be used in other configurations for a tree box filter implementing permeable panels. For example, in another embodiment, stormwater in the media area may pass through one or more permeable panels to a recessed area under the permeable panels. Here, the recess creates a void space in the vault below the area where the permeable panels are positioned. In a preferred embodiment, the dimensions of the recess (and the void space created) may be dimensioned to increase the surface area for stormwater infiltration through the tree box filter.

As a non-limiting example, in a vault where the media area measures approximately 4-feet wide and 4-feet long, permeable panels may rest along a bottom portion of the vault in an area measuring approximately 2-feet wide and 2-feet long. In this case, the recess in the vault below the permeable panels may cover an area larger than that covered by the permeable panels, thereby increasing the surface area of the base rock to which stormwater infiltrating through the tree box filter is exposed.

It may be appreciated that the height of the recess may vary depending on the thickness of the bottom slab or the frame structure on which the permeable panels rest. For example, for a bottom slab or frame structure measuring 6-inches in height, the recess may form a 2-inch high void and 4-inch high floor to support the vault and its contents.

The dimensions discussed above are provided as non-limiting examples, however. It may be appreciated that the dimensions of the tree box vault, media areas, and recesses discussed above and sizes of the floor openings may vary to accommodate different design considerations, such as different tree box filter widths, lengths, and heights (outside and inside dimensions), materials used for construction, desired weights for each tree box filter, desired infiltration capacity, and desired flow rates.

The recesses discussed in these examples are shown as being substantially rectangular in shape. However, it is contemplated that any shape recess of varying dimensions may used to accommodate different design considerations, such as different tree box filter widths, lengths, and heights (outside and inside dimensions), desired storage area, the amount of base rock available for use, ease of fabrication, and the particularities of the landscaped area in which the tree box filter will be installed.

C. Variable Inlet and Outlet Ports

In a preferred embodiment, one or more inlet pipes can be selectively placed at variable locations along the side of the tree box filter to allow for entrance of fluid at variable inlet locations, depending on the structural needs of a particular landscape area or installation site. For example, an inlet pipe may be positioned higher along a side wall so that stormwater may enter from a higher location. Alternatively, an inlet pipe may be positioned lower along a side wall to allow stormwater flow from a lower location. Multiple inlet (and outlet) ports may be incorporated into the tree box filter. This feature provides the ability to accept water flow for filtration, retention, and/or detention into a single assembly from a plurality of different sources and directions.

Similarly, one or more outlet pipes can be selectively placed at variable locations along the side of the tree box to allow stormwater to exit the tree box filter at customizable locations. For example, an outlet pipe may be positioned higher along a side wall so that stormwater may exit from a higher location. Alternatively, an outlet pipe may be positioned lower along a side wall to release stormwater to a lower location in an underground drainage or stormwater management system. This feature allows for further customization and facilitates adaptation of a given tree box filter within an existing stormwater management system.

II. High Flow Bypass Assemblies

The bioretention systems of the present invention may also include one or more high flow bypass assemblies to divert stormwater runoff when the flow exceeds the capacity of the treatment cell; e.g., during heavy stormwater events or due to clogging. In one embodiment shown in FIGS. 1 and 2, the inlet chamber includes a floatables baffle 131 descending from an upper portion of the vault. The floatables baffle descends into an interior space within the rectangular vault. The inlet chamber also includes a bypass weir 132 that extends from a bottom potion of the vault, into an interior space within the rectangular vault. The bypass weir is sized and positioned to allow for sedimentation, flow control, and/or energy dissipation.

In a preferred embodiment, the bypass weir is positioned at least at or higher in elevation than the interior opening of the inlet chamber. As such, it first directs flows accumulating in the inlet chamber through the interior inlet chamber opening and to the treatment cell. Overflows exceeding the capacity of the treatment cell are directed over the bypass weir and into the neighboring outlet chamber, from which it subsequently is released to an underground drainage or other stormwater management system.

In other embodiments, one or more high flow bypass weirs may be cast into a side wall of the tree box filter. In one such configuration, the outlet chamber may be positioned below the inlet chamber, and at least part of the overflows exceeding the treatment capacity of the treatment cell are allowed to flow past the bypass weir, through a side wall of the tree box, and eventually into an outlet chamber, from which it is released from the tree box. An optional floatables baffle may also be included in the side wall, to help prevent the flow of gross pollutants, debris, and other large particles into the outlet chamber. The tree box filter can also be modified to include other bypass ports to accommodate high flow situations.

In alternative embodiments, the tree box filter can be used with one or more external high flow bypass structures, such as a diverter tray, a combination pretreatment/diverter tray, or a conventional catch basin device, that are connected to the tree box filter by external piping or other mechanisms, and known by those in the art for capturing and directing overflow stormwater. Excess fluids may thus proceed through the drainage system out being filtered through the treatment cell during periods of high fluid flow.

III. Filtration Systems

A. Pre-Treatment Areas

The bioretention systems of the present invention may optionally include one or more pre-treatment areas to capture gross pollutants or other substances before the stormwater enters the treatment cell for filtration. As described above, the inlet chamber may include a pretreatment screen to prevent or reduce the flow of gross pollutants and large particles into the treatment cell.

Figure 5:
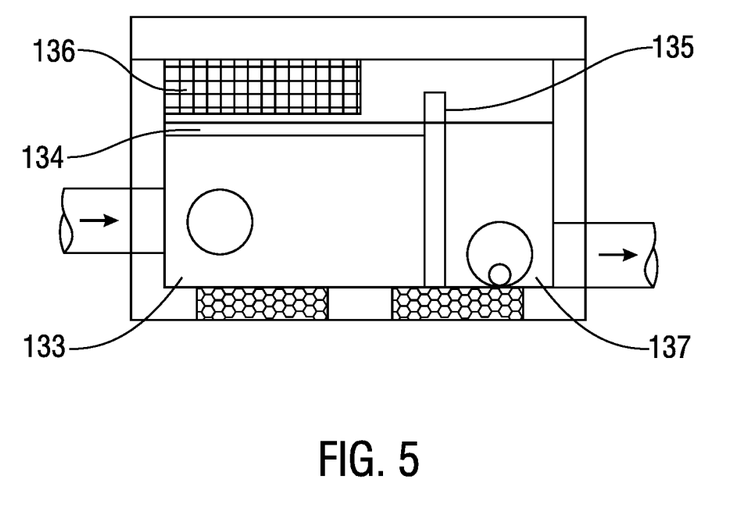
FIG. 5 illustrates schematically a cross-sectional side view of a tree box filter according to another embodiment of the present invention. The tree box filter includes an inlet chamber and outlet chamber. The inlet chamber includes a pretreatment screen and an optional upper tray area, along with a bypass weir adapted to direct high stormwater flows.

FIG. 5 illustrates a cross-sectional side view of inlet and outlet chambers in accordance with another embodiment of the tree box filter invention. The inlet chamber 133 incorporates a tray 134, partially bounded on one side by a substantially vertical bypass weir 135. This structure directs normal flows through a pretreatment screen 136 and into an adjacent treatment cell. Excess flows are directed into an outlet chamber 137 or into one or more intermediate chambers. The inlet chamber may alternatively include other pre-treatment devices well known to the ordinary artisan, such as one or more catch basin inserts (as discussed in further detail below).

B. Filtration Media

In some embodiments, one or more chambers of the tree box filter, including any intermediate chambers, may also incorporate filtration devices to capture sediment, debris, trash, and/or oils and grease from incoming flows. Known filtration devices include, without limitation, "media filter" cartridges containing filter media designed to capture very fine sediments, nutrients, metals, oils, grease, organics, and bacteria; other filtration media; "filter baskets;" filtration pouches; or filtration systems well known to the ordinary artisan that allow for processing stormwater runoff.

A wide range of media—such as, without limitation, combinations of aggregate and organic constituents—are available and may be useful for filtration in the present invention. Moreover, the filter media can be customized to target specific pollutants and/or meet specific pollutant removal criteria. The ability to incorporate filtration systems in close proximity to chambers of a given tree box filter eliminates or at least reduces the need to construct multiple pre-treatment devices outside the boundaries of the assembly. This can greatly reduce the cost and difficulties of added piping and construction.

The dimensions of the tree box filter components discussed above and sizes of the panel openings may vary to accommodate different design considerations, such as different widths, lengths, and heights (outside and inside dimensions), desired weights for each tree box filter, and desired flow rates.

Although specific systems are described in detail above, the present invention provides a range of underground assemblies for bioretention systems. A wide range of underground water management applications may be addressed using the systems described herein. These include but are not limited to all bioretention applications typically addressed with tree boxes, planters, chambers, cisterns, and the like, typically made using simple piping, precast concrete type assemblies. Particular applications include underground stormwater processing, rainwater harvesting, and other water run-off related issues.

These are merely illustrative examples of the various bioretention components and assemblies in some embodiments of the invention. While possible configurations, pipe couplings, and general chamber shapes are shown in the figures, it is within the scope and contemplation of the invention to introduce assemblies in other configurations using different pipe couplings, chamber configurations, and shapes. In addition, as known by those of skill in the art, the number of chambers, the dimensions of the chambers, and the sizes of the openings may vary to accommodate different design considerations, such as different widths, lengths, and heights (outside and inside dimensions), desired weights for each tree box filter, and water flow volumes. The ordinary artisan also will recognize that the absolute dimension of the holes, slots, and openings can be selected to accept industry standard pipe connections/fittings (e.g., rubber boots). Any of a multitude of complementary shapes allowing fluid flow through the module and well known to the ordinary artisan could be used. Such fittings can offer flexible and watertight connections between modular components and piping for controlling water flow into and out of an assembly of modular components.

The structure of the tree box filters described above greatly facilitates the fabrication and construction of underground systems. Both simple (e.g., adjoining of the same tree box filter or chamber assemblies) and more complex systems (e.g., use of multiple modular tree box filters and/or chamber assemblies with outlet flow control, water filtration systems, and other features) of inter-connected structures can be built that provide sufficient load bearing strength and structural integrity for a wide range of underground water management applications. The variation in the types and features of the different tree box filters allow for customization according to the particular needs of a landscape area.

The ordinary artisan will recognize that materials commonly used in applications involving underground retention/detention of water can be employed in the present invention. For example, in various embodiments of the present invention, materials useful for construction of the tree box filters, include but are not limited to: concrete, precast concrete, polypropylene, high-density polyethylene (HDPE), low-density polyethylene (LDPE), rubber, aluminum or any other materials that can be molded or cast for water loading. Further, the bioretention system of the present invention may be constructed as a one-piece design that provides structural integrity and integral foundation. Alternatively, it can be constructed of separate units or "modules" that are assembled to form the system.

It is contemplated that the dimensions of the bioretention systems and its various components can vary within a range dependent on one or more design factors including but not limited to: overall system and site configuration, desired water flow capacity, desired weight of the assemblies, desired load-bearing tolerance for each chamber and the overall bioretention system, and/or the desired amount of water flow to be managed, size and structure of overall bioretention system in which assemblies are used, and/or desired access space for inspection and maintenance purposes.

In various embodiments, it is also contemplated that the dimensions and/or structural configuration of the various chambers of the inventive bioretention system can vary within a range dependent on one or more design factors including but not limited to: overall system and site configuration, desired water flow capacity, desired weight of the assemblies, desired load-bearing tolerance for each chamber and the overall bioretention system, and/or the desired amount of water flow to be managed, size and structure of overall bioretention system in which assemblies are used, and/or desired access space for inspection and maintenance purposes.

The above disclosures are sufficient to enable one of ordinary skill in the art to practice the invention, and provide the best mode of practicing the invention presently contemplated by the inventor. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An assembly for use in a bioretention system comprising:
   a. an inlet chamber comprising an inlet port, a treatment port, and a bypass port;
   b. a treatment chamber adjacent to a first side of the inlet chamber and comprising biofiltration material;
   c. an outlet chamber adjacent to a second side of the inlet chamber and comprising an outlet port; and
   d. a bottom member disposed along a bottom portion of the treatment chamber, the bottom member comprising a substantially pervious region embedded within a substantially impervious region, wherein the substantially pervious region comprises a plurality of removeable panels that are adapted to permit fluid flow, while restricting the passage of gravel and underdrain material therethrough; and
   further wherein the treatment port is adapted to direct stormwater to the treatment chamber and the bypass port is adapted to direct overflow stormwater to the outlet chamber.

2. An assembly for use in a bioretention system comprising:
   a. an inlet chamber comprising an inlet port, a treatment port, and a bypass port;
   b. a treatment chamber adjacent to a first side of the inlet chamber and comprising biofiltration material;
   c. an outlet chamber adjacent to a second side of the inlet chamber and comprising an outlet port;
   d. a bottom member disposed along a bottom portion of the treatment chamber, the bottom member comprising a substantially pervious region embedded within a substantially impervious region; and
   e. a plug overlying at least a portion of the substantially pervious region of the bottom member;
   wherein the treatment port is adapted to direct stormwater to the treatment chamber and the bypass port is adapted to direct overflow stormwater to the outlet chamber.

3. An assembly for use in a bioretention system comprising:
   a. four side walls disposed to form a substantially rectangular vault;
   b. an inlet chamber disposed within the four side walls, the inlet chamber comprising an inlet port, a treatment port, and a bypass port, wherein the elevation of the inlet port is variable;
   c. a treatment chamber adjacent to the inlet chamber, the treatment chamber comprising biofiltration material;

d. an outlet chamber adjacent to the inlet and treatment chambers, the outlet chamber comprising an outlet port; and e. a bottom member adjoining at least two side walls and comprising a substantially pervious region embedded within a substantially impervious region;

wherein stormwater flow within the capacity of the treatment chamber is directed to the treatment chamber through the treatment port and stormwater flow exceeding the capacity of the treatment chamber is directed to the outlet chamber through the bypass port.

4. An assembly for use in a bioretention system comprising:

a. four side walls disposed to form a substantially rectangular vault;

b. an inlet chamber disposed within the four side walls, the inlet chamber comprising an inlet port, a treatment port, and a bypass port;

c. a treatment chamber adjacent to the inlet chamber, the treatment chamber comprising biofiltration material;

d. an outlet chamber adjacent to the inlet and treatment chambers, the outlet chamber comprising an outlet port, wherein the elevation of the outlet port is variable; and e. a bottom member adjoining at least two side walls and comprising a substantially pervious region embedded within a substantially impervious region;

wherein stormwater flow within the capacity of the treatment chamber is directed to the treatment chamber through the treatment port and stormwater flow exceeding the capacity of the treatment chamber is directed to the outlet chamber through the bypass port.

5. An assembly for use in a bioretention system comprising:

a. four side walls disposed to form a substantially rectangular vault;

b. an inlet chamber disposed within the four side walls, the inlet chamber comprising an inlet port, a treatment port, a bypass port, and a tray disposed below the treatment port, wherein the tray is adapted to direct excess fluid flow to an intermediate chamber;

c. a treatment chamber adjacent to the inlet chamber, the treatment chamber comprising biofiltration material;

d. an outlet chamber adjacent to the inlet and treatment chambers, the outlet chamber comprising an outlet port; and e. a bottom member adjoining at least two side walls and comprising a substantially pervious region embedded within a substantially impervious region;

wherein stormwater flow within the capacity of the treatment chamber is directed to the treatment chamber through the treatment port and stormwater flow exceeding the capacity of the treatment chamber is directed to the outlet chamber through the bypass port.

6. An assembly for use in a bioretention system comprising:

a. four side walls disposed to form a substantially rectangular vault;

b. an inlet chamber disposed within the four side walls, the inlet chamber comprising an inlet port, a treatment port, a bypass port, and a substantially horizontal tray disposed below the treatment port, the tray comprising a false floor and a bypass weir extending substantially vertically from a bottom surface of the tray;

c. a treatment chamber adjacent to the inlet chamber, the treatment chamber comprising biofiltration material;

d. an outlet chamber adjacent to the inlet and treatment chambers, the outlet chamber comprising an outlet port; and e. a bottom member adjoining at least two side walls and comprising a substantially pervious region embedded within a substantially impervious region;

wherein stormwater flow within the capacity of the treatment chamber is directed to the treatment chamber through the treatment port and stormwater flow exceeding the capacity of the treatment chamber is directed to the outlet chamber through the bypass port.

7. An assembly for use in a bioretention system comprising:

a. four side walls disposed to form a substantially rectangular vault;

b. an inlet chamber disposed within the four side walls, the inlet chamber comprising an inlet port, a treatment port, and a bypass port;

c. a treatment chamber adjacent to the inlet chamber, the treatment chamber comprising biofiltration material;

d. an outlet chamber adjacent to the inlet and treatment chambers, the outlet chamber comprising an outlet port;

e. a bottom member adjoining at least two side walls and comprising a substantially pervious region embedded within a substantially impervious region; and f. a recess extending below an upper surface of the bottom member;

wherein stormwater flow within the capacity of the treatment chamber is directed to the treatment chamber through the treatment port and stormwater flow exceeding the capacity of the treatment chamber is directed to the outlet chamber through the bypass port.

8. An underground stormwater management system comprising:

a. a first compartment comprising:
an inlet opening, an upper weir extending from an upper portion of the first compartment, a lower weir extending from a lower portion of the first compartment, and an interior passage for stormwater flow;

b. a second compartment downstream from the first compartment and adapted to receive stormwater from the interior passage of the first compartment,
the second compartment comprising a bottom frame member adjoining edges of the vault, wherein the bottom frame member comprises a plurality of substantially permeable panels; and c. a third compartment downstream from the second compartment and adapted to receive stormwater passing the upper and lower weirs,
the third compartment comprising an outlet opening.

9. The underground stormwater management system of claim 8, wherein the second compartment comprises biofiltration material.

10. The underground stormwater management system of claim 8, wherein the upper and lower weirs extend into an interior of the first compartment.

11. The underground stormwater management system of claim 8, wherein the upper and lower weirs are disposed within a side wall of the first compartment.

12. The underground stormwater management system of claim 8, wherein the substantially permeable panels are adapted to permit fluid flow, while restricting the passage of gravel and underdrain material therethrough.

13. The underground stormwater management system of claim 8, wherein the plurality of substantially permeable panels are integral to the bottom frame member.

14. The underground stormwater management system of claim 8, wherein the plurality of substantially permeable panels are connected to the bottom frame member.

15. The underground stormwater management system of claim 8, wherein the substantially permeable panels are removable.

16. The underground stormwater management system of claim 8, further comprising a plug overlying at least a portion of at least one substantially permeable panel.

17. The underground stormwater management system of claim 8, wherein the elevation of the inlet opening is variable.

18. The underground stormwater management system of claim 8, wherein the elevation of the outlet opening is variable.

19. The underground stormwater management system of claim 8, wherein the first compartment comprises a pretreatment screen attached to the interior passage.

20. The underground stormwater management system of claim 8, wherein the second compartment further comprises an underdrain pipe disposed along a lower portion.

21. The underground stormwater management system of claim 8, wherein the first compartment further comprises a tray disposed below the interior passage, and wherein the tray is adapted to direct fluid flow to an intermediate compartment.

22. The underground stormwater management system of claim 8, wherein the first compartment further comprises a substantially horizontal tray disposed below the interior passage, the tray comprising a false floor and a bypass weir extending substantially vertically from a bottom surface of the tray.

23. The underground stormwater management system of claim 8, wherein the second compartment further comprises a recess extending below an upper surface of the bottom frame member.

24. A method of treating stormwater in a bioretention system comprising the steps of:
   a. flowing stormwater through an assembly comprising:
      i. an inlet chamber comprising an inlet port, a treatment port, and a bypass port;
      ii. a treatment chamber adjacent to the inlet chamber along a first side and comprising biofiltration material;
      iii. an outlet chamber adjacent to the inlet chamber along a second side and comprising an outlet port; and
      iv. a bottom member disposed along a bottom portion of the treatment chamber, the bottom member comprising a substantially pervious region embedded within a substantially impervious region;
   b. flowing stormwater within the capacity of the treatment chamber through the treatment port and to the treatment chamber;
   c. flowing stormwater exceeding the capacity of the treatment chamber to the outlet chamber through the bypass port; and
   d. infiltrating at least a portion of the stormwater collected in the treatment chamber through the substantially pervious region and to surrounding soils.

* * * * *